July 28, 1936.                    P. KUCERA                    2,048,705
                                 JAR CLOSURE
                            Filed March 29, 1935
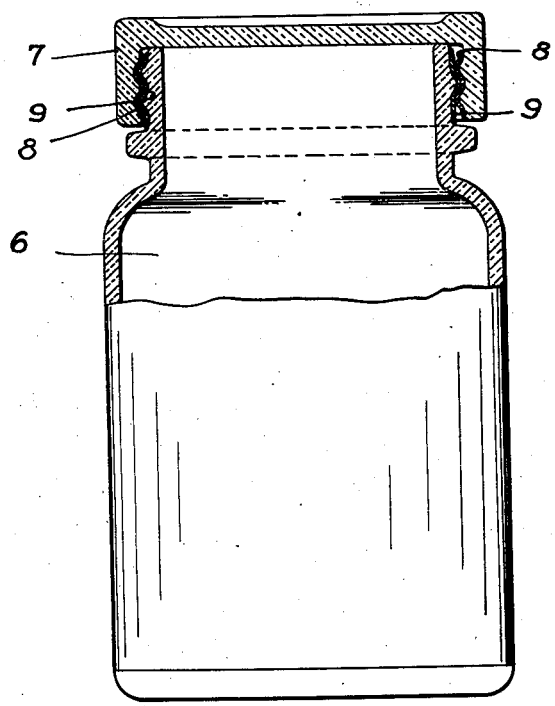
*Fig. 1.*
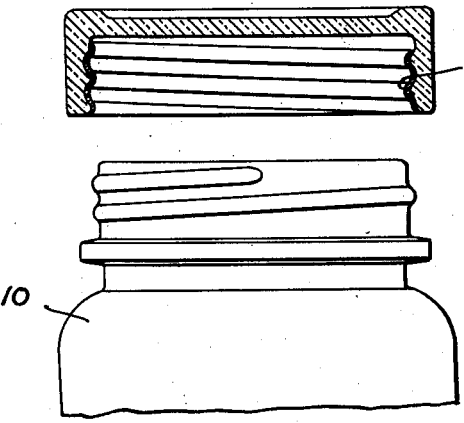
*Fig. 2.*
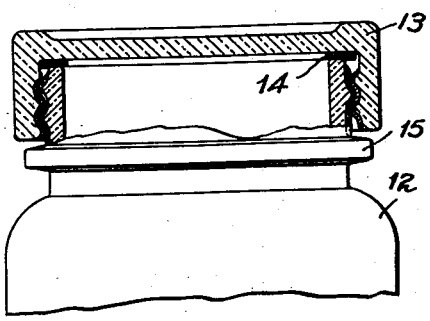
*Fig. 4.*
*Fig. 3.*
INVENTOR
Peter Kucera,
By Archworth Martin,
Attorney.

Patented July 28, 1936

2,048,705

UNITED STATES PATENT OFFICE 2,048,705

JAR CLOSURE

Peter Kucera, Allison Park, Pa., assignor to The Phoenix Glass Company, Monaca, Pa., a corporation of West Virginia Application March 29, 1935, Serial No. 13,655

3 Claims. (Cl. 215—43)

My invention relates to jar closures, and particularly to closures for glass jars. In the case of fruit jars and the like, wherein food stuffs are preserved, the jar is commonly made of glass and provided with a metal screw cap or top.

Attempts have been made to provide lids or screw tops of glass, so as to avoid contact of the jar contents with the metal. These attempts have, however, not been entirely satisfactory, because the glass thread of the lid and the glass thread of the jar neck have an abrading effect on one another, which interferes with proper screwing movement, and which results in particles of glass being ground or broken off.

Other efforts to improve upon the ordinary metal jar lid included the feature of providing a metal lid having a porcelain or glass lining that engaged the upper edge of the jar. Such lids are objectionable because particles of preserved food enter between the lining and metal where the food decomposes and they must be made of two separate parts, and are therefore more complicated and expensive.

My invention has for its object the provision of means whereby a glass or porcelain screw top may be satisfactorily employed for a jar or other vessel formed of similar material.

Some of the forms which my invention may take are shown in the accompanying drawing wherein Figure 1 is a vertical sectional elevational view through a jar and its lid; Fig. 2 is a view showing a jar lid similar to that of Fig. 1; Fig. 3 shows a modification of the jar of Fig. 1, which may be used with the lid of Fig. 2, and Fig. 4 shows still another modification.

Referring to Fig. 1, the numeral 6 designates a glass jar that is provided with a glass lid 7. The jar and the lid are provided with the usual screw threads whereby the lid can be securely attached to the jar.

An important feature of my invention consists in the provision of means for preventing glass-to-glass contact as between the threads of the jar and the lid threads. To this end, I apply a coating or film of metal to the threads of the jar and the lid, although the metal could be applied to the lid threads alone, or to the jar threads alone. The metal can be conveniently applied by a spraying operation through the use of a metal spray gun of any well-known type, wherein a wire or rod of metal is fed into the gun and there melted and blown against the surface to be coated. In the coating of the glass threads, I find it desirable to spray the glass articles immediately upon removal thereof from the molds, and while they retain a considerable portion of their heat, although fairly intimate contact can be obtained by spraying the glass after it has become cold. By spraying the glass while hot, however, there is such close adhesion or fusion of the metal with the glass as to render them practically integral.

The metal coating on the lid is indicated by the numeral 8, and the metal coating on the jar threads is indicated by the numeral 9.

Aluminum, tin, stainless steel, or various other metals are suitable for the purpose, although I prefer to use some of the softer or malleable metals, since a better fit can be effected between the threads of the lid and the threads of the neck. In the case of aluminum or tin, the slight contact which the contents of the jar might have with the upper edges of the metal coating would not be harmful, and in the case of these and other soft metals, it will in some cases be unnecessary to use the usual rubber sealing rings.

In Fig. 3, I show a structure wherein the jar 10 does not have its threads coated, the lid of Fig. 2, however, having a metal coating 11, for use with the uncoated thread of the jar 10 of Fig. 3.

In Fig. 4, I show a jar 12 and its lid 13 formed substantially in the same manner as the jar and lid of Fig. 1, but wherein a rubber sealing ring 14 is provided between the upper edge of the jar and the adjacent surface of the lid. The rubber ring will be used to effect a better seal in those cases wherein the metal-coated threads are insufficient to effect proper air-tight connection, as after repeated use of the jar and lid, and the ring will also prevent any contact whatever of the contents of the jar with the metal coatings. A rubber ring could, of course, be placed between the lower edge of the lid and the flange or rib 15 of the jar.

It will be understood that the invention is applicable to other ceramic materials, such as porcelain. The metal may be deposited in a layer of approximately .003 inch in thickness, or less, but will be made somewhat thicker if a soft metal seal is desired, or if the jar is to be used repeatedly.

I claim as my invention:—

1. A ceramic article composed of separable parts having telescopic engagement with one another, the engaging surface of one part being faced with a ductile metal coating applied thereon by impact, when in a molten condition.

2. The combination with two articles of ceramic material having threaded engagement with one another, of a metal facing formed integrally with the threads of one of the articles, by depositing molten ductile metal thereon to a thickness of not substantially less than .003 inch through impact.

3. A glass article comprising interfitting parts having their opposed surfaces coated with metal applied thereto when in a molten condition, by impact.

PETER KUCERA.